(12) United States Patent
Boitard et al.

(10) Patent No.: US 12,506,407 B2
(45) Date of Patent: Dec. 23, 2025

(54) DIGITALLY-CONTROLLED DC-DC CONVERTER

(71) Applicant: NXP B.V., Eindhoven (NL)

(72) Inventors: Fabien Boitard, Mouans Sartoux (FR); Ludovic Oddoart, Opio (FR); Christian Vincent Sorace, Falicon (FR)

(73) Assignee: NXP B.V., Eindhoven (NL)

( * ) Notice: Subject to any disclaimer, the term of this patent is extended or adjusted under 35 U.S.C. 154(b) by 414 days.

(21) Appl. No.: 18/349,301

(22) Filed: Jul. 10, 2023

(65) Prior Publication Data
US 2024/0048050 A1     Feb. 8, 2024

(30) Foreign Application Priority Data

Aug. 2, 2022   (EP) .................................... 22306168

(51) Int. Cl.
| | |
|---|---|
| *H02M 3/157* | (2006.01) |
| *H02M 1/088* | (2006.01) |
| *H02M 3/158* | (2006.01) |

(52) U.S. Cl.
CPC ........... *H02M 3/157* (2013.01); *H02M 1/088* (2013.01); *H02M 3/158* (2013.01)

(58) Field of Classification Search
CPC ....... H02M 3/157; H02M 1/088; H02M 3/158
See application file for complete search history.

(56) References Cited

U.S. PATENT DOCUMENTS

| | | |
|---|---|---|
| 5,475,296 A | 12/1995 | Vinsant et al. |
| 7,449,869 B2 | 11/2008 | Markowski |
| 7,456,621 B2 | 11/2008 | Leung et al. |
| 7,710,174 B2 | 5/2010 | Prodić et al. |

(Continued)

FOREIGN PATENT DOCUMENTS

| | | |
|---|---|---|
| CA | 2483378 A1 | 4/2006 |
| EP | 3557768 A1 | 10/2019 |
| JP | 5186148 B2 | 4/2013 |

OTHER PUBLICATIONS

Boscaino, Valeria et al.; "A novel digital control for DC/DC converters to improve steady-state performances"; INTELEC 06—Twenty-Eighth International Telecommunications Energy Conference, Sep. 10-14, 2006 in Providence, Rhode Island; DOI: 10.1109/INTLEC.2006.251653.

(Continued)

*Primary Examiner* — Rafael O De Leon Domenech

(57) ABSTRACT

A digitally controlled DC-DC converter has a power stage coupled to an input voltage and to a control signal to generate an output voltage in response to the control signal. A controller generates the control signal and has an adjustment block to compare the output voltage to a reference voltage to generate a comparison signal, a logic circuit coupled to the adjustment block to receive the comparison signal and to generate the control signal in response to the comparison signal using a control word, and a digital-to analog converter coupled to the adjustment block, the power stage input voltage and the logic circuit to receive the control word from the logic circuit and to generate a converter voltage representing the control word using another voltage, the converter voltage being applied to the adjustment block to adjust the comparison signal.

20 Claims, 8 Drawing Sheets

(56) References Cited

U.S. PATENT DOCUMENTS

| | | | |
|---|---|---|---|
| 7,759,921 B2 | 7/2010 | Prodic | |
| 7,990,122 B2 | 8/2011 | Sase et al. | |
| 9,099,924 B2 | 8/2015 | Galloway | |
| 10,720,830 B2 | 7/2020 | Philip et al. | |
| 11,056,972 B2 | 7/2021 | Philip et al. | |
| 11,057,010 B2 | 7/2021 | Al-kadi et al. | |
| 2006/0132110 A1* | 6/2006 | Tang | H02M 3/1584 323/282 |
| 2008/0129263 A1* | 6/2008 | Kotikalapoodi | H02M 3/157 323/283 |
| 2011/0193540 A1* | 8/2011 | Dasgupta | H02M 1/15 323/282 |
| 2016/0111956 A1* | 4/2016 | Childs | H02M 3/156 323/271 |
| 2017/0070141 A1* | 3/2017 | Mahmoudi | H02M 3/33507 |

OTHER PUBLICATIONS

Ishizuka, Yoichi et al.; "A design of a low-delay DPWM control circuit for DC-DC converter"; INTELEC 07—29th International Telecommunications Energy Conference in Rome Italy, Sep. 30-Oct. 4, 2007; DOI: 10.1109/INTLEC.2007.4448795.

Keeping, Steven; "The Rise of Digital Control for DC/DC Regulation"; May 14, 2013; Contributed by Electronic Products Magazine.

Liou, Wan-Rone et al.; "A Programmable Controller IC for DC/DC Converter and Power Factor Correction Applications"; IEEE Transactions on Industrial Informatics, vol. 9, Issue 4; Nov. 2013; DOI: 10.1109/TII.2012.2235845.

* cited by examiner

DIGITALLY-CONTROLLED DC-DC CONVERTER

CROSS-REFERENCE TO RELATED APPLICATIONS

This application claims priority under 35 U.S.C. § 119 to European Patent Application No. 22306168.0, filed on Aug. 2, 2022, the contents of which are incorporated by reference herein.

BACKGROUND

A direct current (DC) to DC converter is in a common class of devices used widely to convert DC at one voltage to DC at another voltage. A DC-DC buck converter reduces the voltage at the output from the input voltage. A DC-DC converter always wastes some energy during the conversion. Reducing the loss is important for reducing general energy consumption and still more important for battery-powered devices in order to extend the battery life. Instead of transformers, many DC-DC converters are configured with switching power supplies. Two or more transistors between the input and the output voltage are switched on and off with some duty cycle to increase or decrease the voltage, respectively. A filter circuit is used at the output to reduce voltage ripples caused by the switching.

To control the output voltage, the duty cycles of the switching transistors are regulated based on a desired reference voltage. Many DC-DC converters use a regulation loop with precision analog voltage regulation circuitry. The quality of the analog circuitry determines the accuracy of the output voltage, but quality analog circuitry is expensive and may be large. Deep stability analysis is used to develop the complex design of a quality analog regulation loop for a ramp generator, a current sensor for current mode, a transconductance cell and a loop comparator.

Other converters use a digital regulation loop with an analog-to-digital converter (ADC). The ADC allows the analog output voltage to be compared to a digital reference value. The accuracy of the analog output voltage depends on the quality of the ADC. A high quality accumulator and high bit count for the counter in the ADC is used. Accordingly, a high quality ADC may also be expensive and require a large area on an integrated circuit (IC).

SUMMARY

A digitally controlled DC-DC converter is described. In an embodiment, a power stage is coupled to an input voltage and to a control signal and is configured to generate an output voltage in response to the control signal. A controller generates the control signal and is coupled to the power stage to provide the control signal to the power stage. The controller has an adjustment block coupled to the power stage output voltage to compare the output voltage to a reference voltage to generate a comparison signal, a logic circuit coupled to the adjustment block to receive the comparison signal and to generate the control signal in response to the comparison signal using a control word, and a digital-to analog converter coupled to the adjustment block, the power stage input voltage and the logic circuit to receive the control word from the logic circuit and to generate a converter voltage representing the control word using another voltage, the converter voltage being applied to the adjustment block to adjust the comparison signal.

In some embodiments, the another voltage is the input voltage to the power stage. In some embodiments, the adjustment block includes an error amplifier coupled to the output voltage and to the reference voltage to generate an error voltage that represents a difference between the output voltage and the reference voltage, and a comparator coupled to the error amplifier and the logic circuit to receive the error voltage and the converter voltage and to generate the comparison signal in response to comparing the error voltage and the converter voltage.

In some embodiments, the another voltage is an error voltage related to a difference between the output voltage and the reference voltage. In some embodiments, the adjustment block includes an error amplifier coupled to the output voltage and to the reference voltage to generate an error voltage that represents a difference between the output voltage and the reference voltage, and a comparator coupled to the error amplifier and the logic circuit to receive the input voltage and the converter voltage and to generate the comparison signal in response to comparing the input voltage and the converter voltage.

In some embodiments, the control word represents a duty cycle of the control signal using a number of bits and wherein the converter voltage scales the another voltage based on the duty cycle. In some embodiments, the control word represents a ratio of the output voltage to the input voltage. In some embodiments, the logic circuit generates the control word using an up and down counter and wherein the up and down counter counts in response to the comparison signal.

In some embodiments, the logic circuit is coupled to a clock signal having a clock frequency and wherein the control signal is a pulse width modulation signal having a switching cycle determined by the clock frequency. In some embodiments, the logic circuit adjusts the control word at each switching cycle. In some embodiments, the logic circuit adjusts the control word by one bit at each switching cycle. In some embodiments, the logic circuit comprises a counter coupled to receive the comparison signal and to increment or decrement the control word based on the received comparison signal. In some embodiments, the power stage comprises switches between the input voltage and the output voltage and wherein the power stage opens and closes the switches in response to the control signal. In some embodiments, the power stage switches are coupled in series with the control signal coupled to the gates of the switches and with the output voltage at a common drain of the switches. In some embodiments, the power converter comprises a direct current to direct current buck converter.

In an embodiment, a method of operating a power converter is described, the power converter comprising an input, an output, a controller, and a power stage coupled between the input and the output. The method includes receiving an input voltage at the power stage input, generating an output voltage at the power stage output in response to a control signal, comparing the output voltage to a reference voltage, generate a comparison signal in response to the comparing, generating the control signal in the controller in response to the comparison signal using a control word, and generating a converter voltage representing the control word in a digital-to-analog converter using another voltage, wherein the converter voltage is applied to adjust the comparison signal.

In some embodiments, generating a comparison signal includes generating an error voltage that represents a difference between the output voltage and the reference voltage, generating the converter voltage by factoring the input voltage by the control word, and generating the comparison signal in response to comparing the error voltage and the converter voltage.

In some embodiments, generating a comparison signal includes generating an error voltage that represents a difference between the output voltage and the reference voltage, generating the converter voltage by factoring the error voltage by the control word, and generating the comparison signal in response to comparing the converter voltage and the input voltage.

Some embodiments further include generating the control word using an up and down counter, wherein the up and down counter counts in response to the comparison signal. Some embodiments further include a clock signal having a clock frequency and wherein generating the control signal comprises generating a pulse width modulation signal having a switching cycle determined by the clock frequency. In some embodiments, the power stage comprises switches between the input voltage and the output voltage and wherein generating the output voltage comprises opening and closing the switches in response to the control signal.

In an embodiment, a power converter includes means for generating an output voltage using an input voltage in response to a control signal, means for comparing the output voltage to a reference voltage and generating a comparison signal in response to the comparing, means for generating the control signal in response to the comparison signal using a control word, and means for converting the control word from digital to analog to generate the converter voltage wherein the converter voltage is applied to adjust the comparison signal.

In some embodiments, the means for comparing includes means for generating an error voltage that represents a difference between the output voltage and the reference voltage and means for generating the comparison signal in response to comparing the error voltage and the converter voltage, wherein the means for generating the converter voltage factors the input voltage by the control word.

In some embodiments, the means for comparing includes means for generating an error voltage that represents a difference between the output voltage and the reference voltage and means generating the comparison signal in response to comparing the converter voltage and the input voltage, wherein the means for generating the converter voltage factors the error voltage by the control word.

In some embodiments, the means for generating the control word comprises an up and down counter, wherein the up and down counter counts in response to the comparison signal. In some embodiments, the means for generating the control signal generates a pulse width modulation signal having a switching cycle determined by an input clock frequency. In some embodiments, the means for generating an output voltage opens and closes switches between the input voltage and the output voltage in response to the control signal.

DETAILED DESCRIPTION

Figure 1:
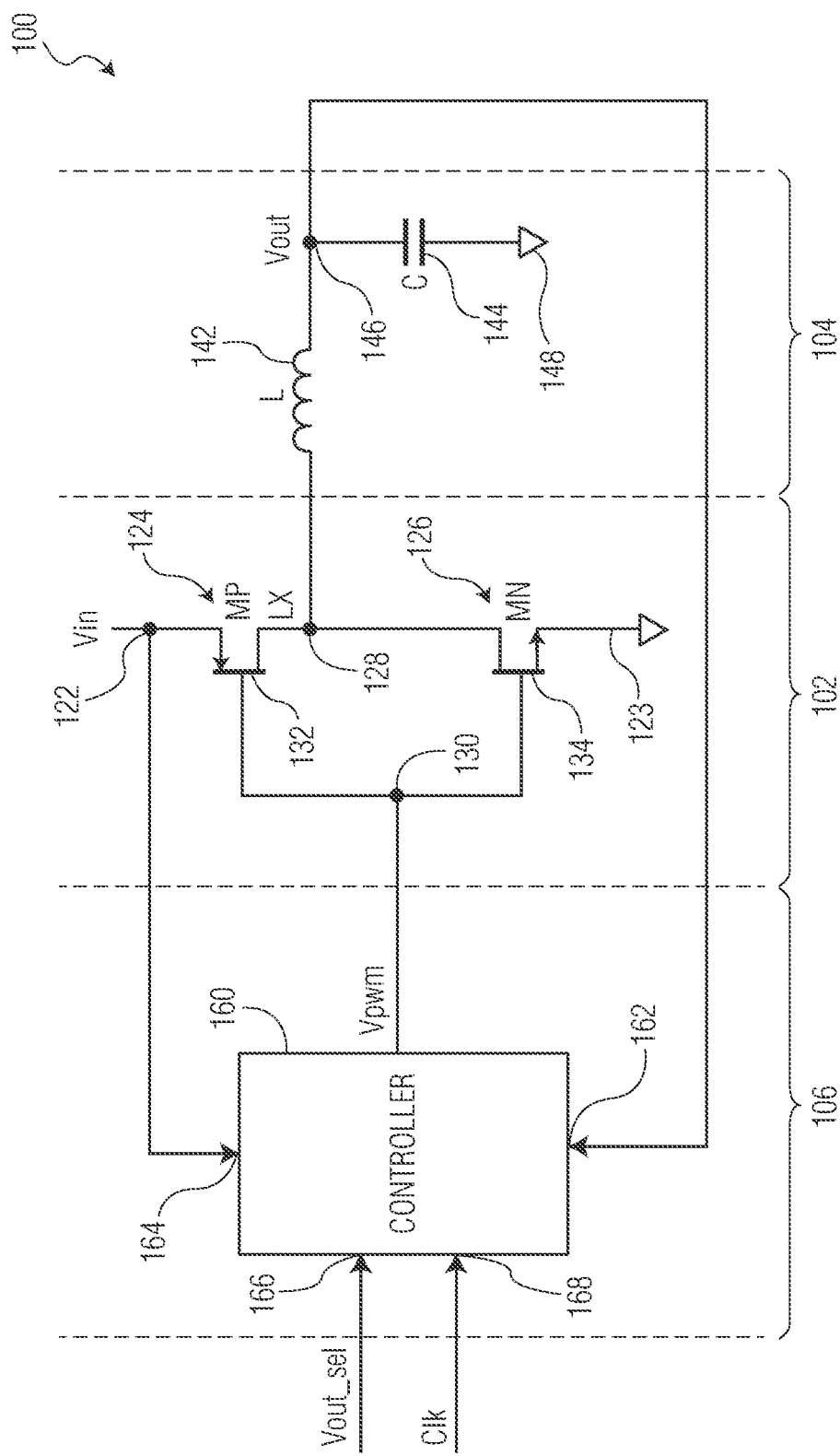
FIG. 1 is a circuit diagram of a DC-DC buck converter.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

As described herein a DC-DC converter has a regulation loop that is both accurate and inexpensive. The power stage is coupled to a digital regulation loop that uses a digital-to-analog converter (DAC). No ADC is required. The controller uses an error amplifier, a comparator, and a digital block with the DAC. The regulation loop may be used with a buck converter, a boost converter, or derivatives, or combinations thereof. Embodiments are shown as single phase converters, although according to various other embodiments, different switch module converter topologies for the power stage may be used, for example a multiphase buck converter, or multiphase boost converter. The converter may be a single-transistor forward type converter, a two-transistor forward type converter, a push-pull type converter, a half bridge type converter or a full bridge type converter. The converters are used to drive a load that may be any electrical or electronic circuit requiring regulated power, such as computer equipment, telecommunications equipment, instrumentation, motors, etc.

FIG. 1 is a circuit diagram of a DC-DC buck converter 100. The DC-DC buck converter 200 has a power stage 102 to reduce the input voltage to an output voltage, an output filter stage 104 to reduce ripples in the output voltage, and a control stage 106 to regulate the action of the power stage. The control stage is a digital regulation loop.

The power stage has a P-type power metal oxide semiconductor field effect transistor (MOSFET) 124 and an N-type power MOSFET 126 connected anti-parallel and in series. The drain of the P-type power MOSFET 124 is coupled to the drain of the N-type power MOSFET 126 through a common drain node 128. The power stage is coupled to an input voltage, Vin, at an input node 122 and to a control signal, Vpwm, at a control node 130 and is configured to generate an output voltage, Vout, at an output terminal 146, in response to the control signal, Vpwm. The power stage receives the input DC voltage Vin across a positive node at the input node 122 and a common or ground node 123. The positive node 122 is coupled to a source of the P-type power MOSFET 124. The ground node is coupled to a source of the N-type power MOSFET 126. The P-type power MOSFET 124 and the N-type power MOSFET 126 are both regulated in common by the control voltage, Vpwm, provided to the control node 130. The control node is coupled to a gate 132 of the P-type MOSFET 124 and to a gate 134 of the N-type power MOSFET 126. The control voltage, Vpwm, applies a pulse width modulation (PWM) signal to the control node 130 to control the reduction in voltage through the power stage 102. The power stage 102 may be simpler or more complex to suit different uses of the DC-DC buck converter 100.

The output filter stage 104 has a series inductor 142 coupled to the common power node 128 of the power stage on one side and the output terminal 146 on the other side. A parallel capacitor 144 is coupled between the output terminal 146 and ground 148. The output voltage, Vout, with reduced power output power from the DC-DC buck converter 100 is taken across the output terminal 146 and ground 148 and is coupled to a load (not shown). The simple inductor-capacitor output filter is sufficient for many applications. Other types of components may be used to suit details of particular physical implementations. A simpler or more complex output filter stage may be used to suit different uses of the DC-DC buck converter 100.

The control stage 106 has a controller 160 to generate the control signal, Vpwm, and is coupled to the power stage 102 to provide the control signal to the power stage. The controller is coupled to the output terminal 146 to receive the output voltage, Vout, at a first input terminal 162 of the controller 160. The controller 160 is coupled to the input node 122 to receive the input voltage, Vin, at a second input terminal 164. The controller compares the input voltage, Vin, to the output voltage, Vout, and regulates the power stage 102 using the control voltage, Vpwm, provided from the controller 160 to the control node 130 of the power stage 102. The controller 160 further receives a reference voltage selection signal, Vout_sel, at a third input 166 and a clock signal, Clk, for example a stable reference clock at a fourth input terminal 168 to regulate operations within the controller 160.

Figure 2:
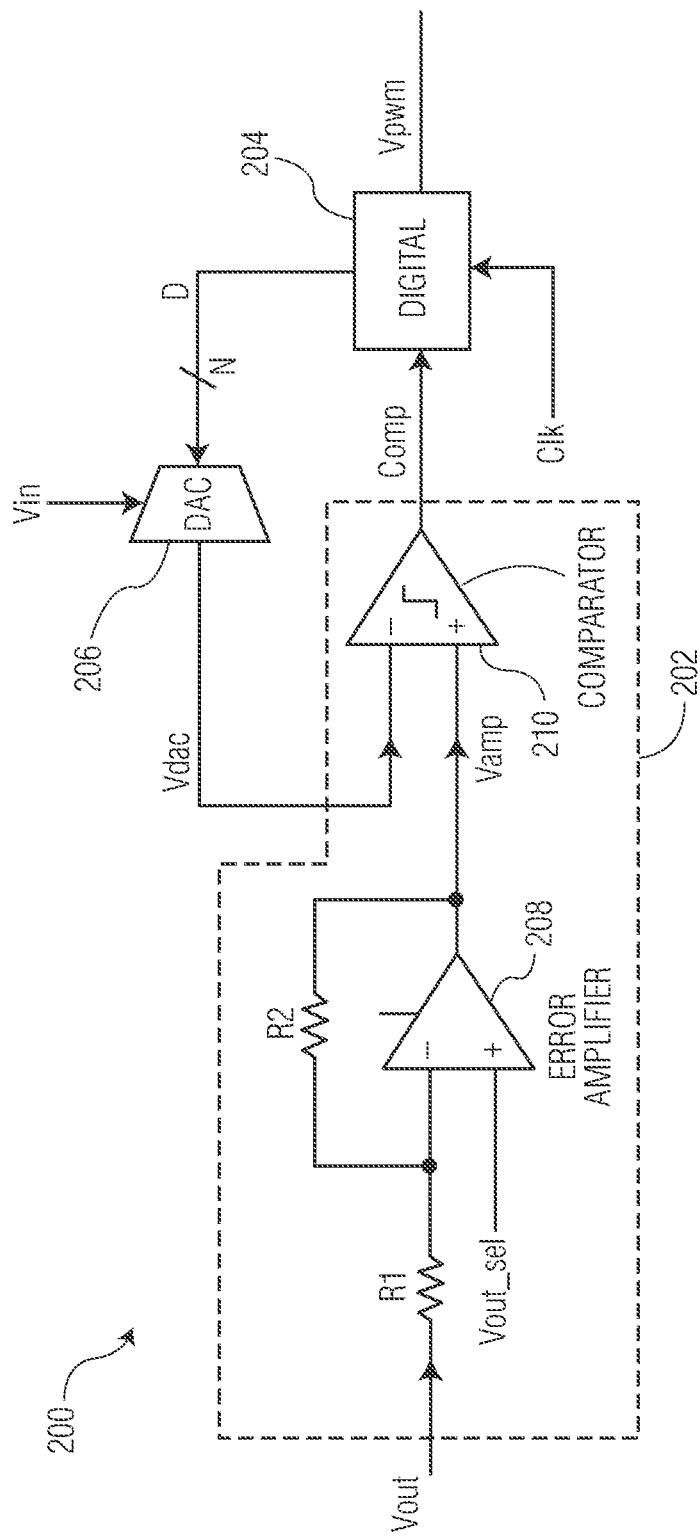
FIG. 2 is a block diagram of an example controller suitable for use in a digital regulation loop for a DC-DC buck converter as described in FIG. 1.

FIG. 2 is a block diagram of an example controller 200 suitable for use in a digital regulation loop for a DC-DC buck converter as described in FIG. 1. The controller 160 includes an adjustment block 202 coupled to receive the output voltage, Vout, from the output terminal 146. The adjustment block 202 is also coupled reference source to receive a reference voltage selection signal, Vref_sel. The adjustment block compares the output voltage, Vout, to the reference voltage selection signal, Vref_sel, to generate a comparison signal, Comp.

The controller 200 includes a logic circuit 204 coupled to the adjustment block 202 to receive the comparison signal, Comp, and to generate the control signal Vpwm, in response to the comparison using a control word, D. The control signal, Vpwm, is coupled to the common control node 130 to regulate the power stage 102. The logic circuit 204 generates the control signal, Vpwm, using the control word, D, which is coupled to a DAC 206 of the controller.

The DAC 206 receives the control word, D, and converts it to analog output as a converter voltage, Vdac, that is coupled as an input to the adjustment block 202. The DAC 206 is also coupled to the input voltage, Vin, to receive the input voltage. The DAC generates the converter voltage, Vdac, representing the control word, D, in analog form using the input voltage, Vin. The converter voltage, Vdac, is applied to the adjustment block 202 to adjust the comparison signal, Comp.

The adjustment block 202 includes an error amplifier 208 and a comparator 210. The error amplifier 208 is coupled to the output voltage, Vout, for example at the output terminal 146 and to the reference voltage selection signal, Vout_sel, to generate an error voltage, Vamp, that represents a difference between the output voltage, Vout, and the reference voltage selection signal, Vout_sel. The reference voltage selection signal, Vout_sel, is described here as a constant, but may be varied over time to suit the load, for example for startup and shutdown operations or for high load and low load operations. The output voltage, Vout, is scaled by a first series resistor, R1, at the error amplifier 208 input, and a second feedback resistor, R2, between the error voltage, Vamp, output and the output voltage, Vout, input to the error amplifier. The resistors adjust the gain of the output voltage, Vout, by a ratio R2/R1.

The adjustment block 202 also includes a comparator 210 coupled to the error voltage, Vamp, which is the output of the error amplifier as an input and to the converter voltage, Vdac, as an input. The comparator 210 compares the error voltage, Vamp, and the converter voltage, Vdac, and generates the comparison signal, Comp, in response to comparing the error voltage, Vamp, and the converter voltage, Vdac. As mentioned above, the comparison signal is provided to the logic circuit 204 to generate the control signal, Vpwm.

Figure 3:
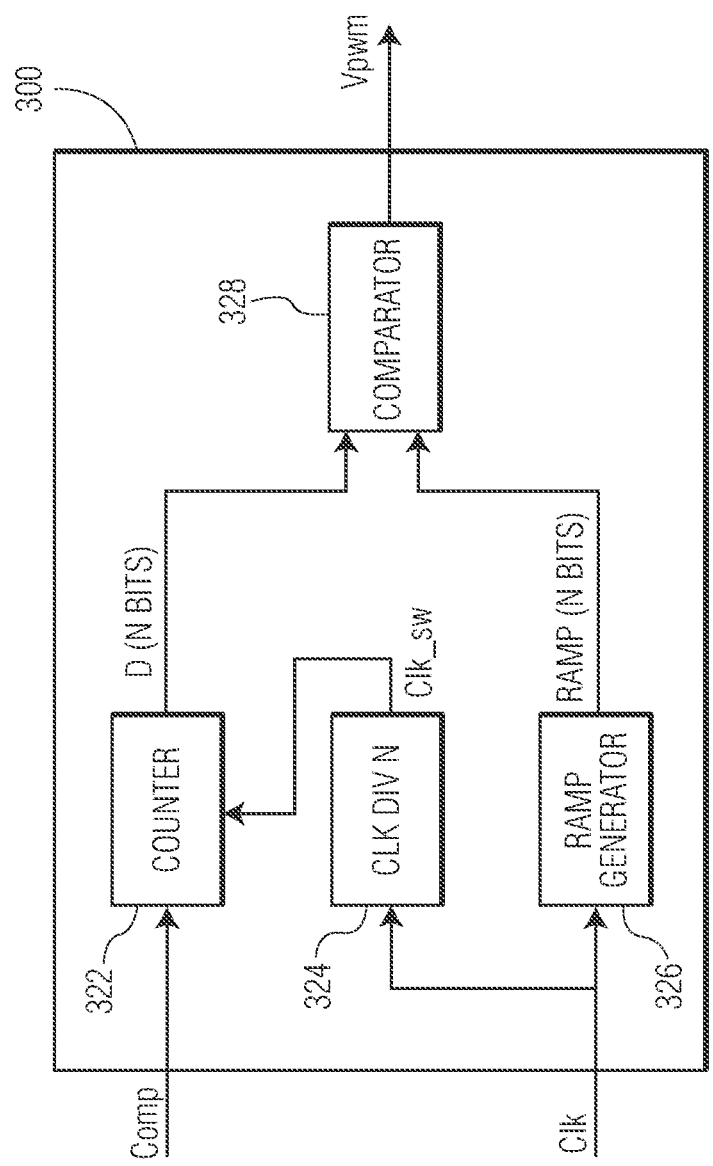
FIG. 3 is a block diagram of an example logic circuit suitable for use in the digital regulation loop of FIG. 2.

FIG. 3 is a block diagram of an example logic circuit 300 suitable for use in the digital regulation loop of FIG. 2. The logic circuit receives the comparison signal, Comp, as an input to a counter 322. A clock signal, Clk, is provided to a clock divider 324. The clock divider 324 divides the input clock signal, Clk, by a number N. The divided clock signal, Clk_sw, defines the switching frequency of the DC-DC buck converter. The counter counts up to N bits from 0 to $2^N$. The counter 322 uses the divided clock signal, Clk_sw, from the clock divider 324 to increment or decrement its output, the control word, D, based on the input comparison signal, Comp. The control word, D, is described as having N bits. This is the same control word, D, that is converted to a converter voltage, Vdac, by the DAC 206 of FIG. 2. The number of bits for the DAC is configured for the desired control voltage, Vpwm, accuracy which determines the output voltage accuracy. The number of bits may be configured by the clock frequency of the divided clock signal, Clk_sw, to the counter. The frequency of the clock signal, Clk, to the ramp generator 326 determines the number of bits in the ramp output to the ramp generator which controls the duty cycle of the power stage and therefore the times at which the power stage switches change state during the switching frequency of the DC-DC buck converter.

The control word, D, is an input to a comparator 328 to control the duty cycle of the logic circuit output voltage, the control voltage, Vpwm. An input ramp generator 326 receives the clock signal, Clk, and generates an N-bit ramp using the clock signal. The N-bit ramp is provided as a second input to the comparator 328. The compensation word, D, is combined with the N-bit ramp in the comparator 328 to impose a duty cycle onto the N-bit ramp, as determined by the control word, D, to generate the control signal, Vpwm. In some embodiments, the duty cycle of the control signal, Vpwm, may be from 0% with a compensation word, D, of 0, to 100% with a compensation word of $2^N$. In some embodiments N is 6, however, other values from 3 to 8 and beyond may be used. The control signal, Vpwm, is provided from the comparator 328 to the output stage 102, as discussed above to control the duty cycle of the output stage 102 and thereby to control the output voltage, Vout, of the DC-DC buck converter. The duty cycle may be considered as the ratio of on time to off time of the power stage switches.

Figure 4:
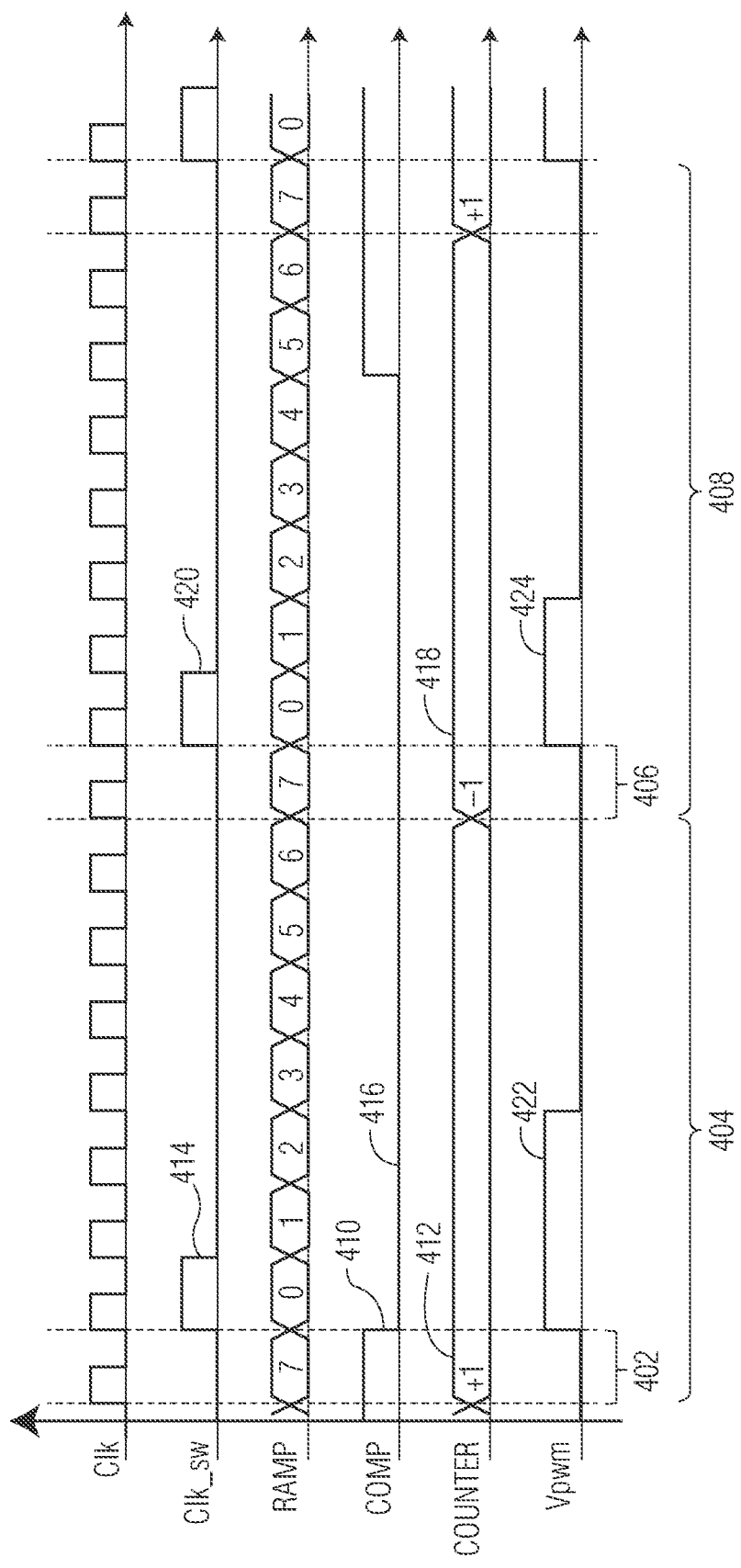
FIG. 4 is a signal timing diagram of an example portion of the operation of the logic circuit of the DC-DC buck converter as described with respect to FIG. 3.

FIG. 4 is a signal timing diagram of an example portion of the operation of the logic circuit 300 of the DC-DC buck converter 100 as described with respect to FIG. 3. The signal state as high or low is shown on the vertical axis against time on the horizontal axis. The top signal is the clock signal, Clk, that is the input clock signal applied to the ramp generator 326. The divided clock signal, Clk_sw, also updates the counter 322 of the logic circuit 300. The ramp is the N-bit ramp signal from the ramp generator 326. Comp is the comparison signal sent to the counter 322 as the input to the counter 322. Counter is an intermediate state within the counter 322 in which the control word, D, is incremented or decremented by a count of 1. Vpwm is the control signal generated by the ramp generator 328 by combining the control word, D, and the ramp.

The divided clock signal, Clk_sw, divides the clock signal, Clk, by $2^N$, which is eight in this example. A single clock count is shown as having a short duration 402, 404, and eight clock counts are shown as defining a cycle 404, 406 of the logic circuit. The ramp signal increments from 0 to 7 and back to 0 in the time of each cycle. This corresponds to 8 bits per cycle and N is set to 3. The ramp is delayed by one count. At the first count 402, the comparison signal, Comp, is high at 410. This pushes the counter signal to increment by +1 at 412 for the duration of the cycle 404. At the next pulse 414 from the divided clock, the comparison signal, Comp, is low at 416. This causes the counter to increment by −1 at 418 until the next divided clock signal pulse 420. The counter continues to increment by +1 or −1 in response to the comparison signal, Comp. The incrementing of the counter changes the value of the control word, D. If the comparison signal, Comp, remains low for several cycles, then the control word, D, will be steadily decremented and similarly if the comparison signal, Comp, remains high for several cycles, then the control word, D, will be increased with each cycle 404, 408.

The control signal, Vpwm, has a duty cycle that may be changed with each cycle. The duty cycle is controlled by the ramp signal so that it may have a duty cycle or ON time of from 0-8 parts of a cycle. During the first cycle 404, the control signal, Vpwm, has an ON time 422 of three counts of the eight-count duty cycle. During the second duty cycle 408, the control word, D, has been decremented as shown by the −1 value of the counter signal. This causes the ON time 424 of the control signal, Vpwm, to be reduced from three counts to two counts of the second duty cycle 408.

Figure 5:
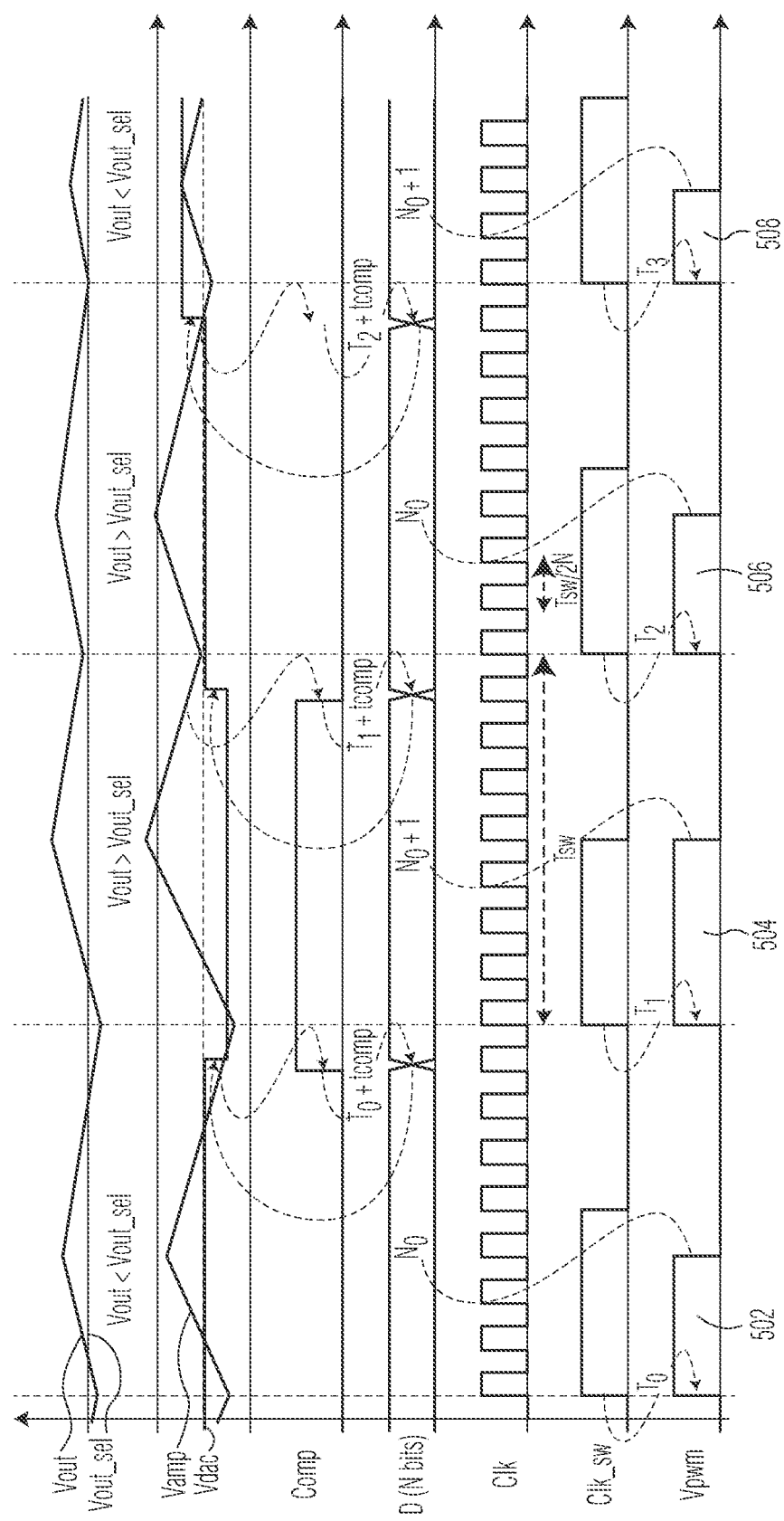
FIG. 5 is a signal timing diagram of an example portion of the operation of the DC-DC buck converter as described with respect to FIG. 1.

FIG. 5 is a signal timing diagram of an example portion of the operation of the DC-DC buck converter 100 as described with respect to FIG. 1 using the controller 200 and logic circuit 300 as described with reference to FIGS. 1 to 3. The signal state as high or low is shown on the vertical axis against time on the horizontal axis. The top signal is the output voltage, Vout, shown as a sawtooth waveform superimposed over the steady state reference voltage selection signal, Vout_sel. The second signal is the error signal, Vamp, shown as a sawtooth waveform superimposed over the converter voltage, Vdac, which has a step function. The third signal is the comparison signal, Comp which has a step function. The fourth signal is the control word, D, with only timing shown and the value of the control word, D, indicated as values relative to a median value $N_0$. The fifth signal is the clock signal, Clk. The sixth signal is the divided clock signal, Clk_sw. The seventh signal is the control signal, Vpwm, shown as a duty cycle in which a longer duration of the high portion of the signal in a cycle represents a longer duty cycle.

The beginning of each cycle is indicated on the divided clock signal, Clk_sw, in which the first cycle begins at time $T_0$. The second cycle begins at time $T_1$. The third cycle begins at time $T_2$, and the fourth cycle begins at time $T_3$. The control signal, Vpwm, begins a new duty cycle at the beginning of each cycle. The first control signal pulse 502 has a duration of three counts of the clock signal, Clk, based on the control word, D, having the value $N_0$. The second control signal pulse 504 has a duration of four counts of the clock signal, Clk, based on the control word, D, having the value $N_0+1$. The third control signal pulse 506 has a duration of three counts of the clock signal, Clk, based on the control word, D, having the value $N_0$. The fourth control signal pulse 508 has a duration of two counts of the clock signal, Clk, based on the control word, D, having the value $N_0-1$. The value for $N_0$ may be three corresponding to the number of counts of the clock signal, Clk, but other values are possible, and the diagram may be modified for 16, 32, 64, etc. counts of the clock signal per cycle.

The value of the control word, D, is modified in the logic circuit 204 based on the results of the comparator 210 in the comparison signal, Comp. The comparison signal, Comp, from the comparator 210 is sampled at a regular fixed interval indicated as tcomp. The sampling is performed on the clock signal count before the start of the next duty cycle for the next switching period, indicated as $T_0$, $T_1$, $T_2$, $T_3$. The comparator compares the error voltage, Vamp, to the converter voltage, Vdac, which are shown superimposed as the second signals. The error voltage, Vamp, is centered around the reference voltage, Vout_sel, and the error is amplified by the gain K, as stated in Eq. 1, below. The error voltage, Vamp, is compared to the converter voltage, Vdac, after a delay of duration tcomp, shown as seven divided clock signal counts. The control word, D, is then updated. A change in the control word, D, will trigger a new converter voltage, Vdac, for the comparison in the next cycle.

As shown, at the first sampling time, $T_0$+tcomp, which is seven divided clock signal counts from time $T_0$, the error voltage, Vamp, is less than the converter voltage, Vdac. As a result, the control word, D, is incremented from $N_0$ to $N_0$+1. At the second sampling time, $T_1$+tcomp, the error voltage, Vamp, is greater than the converter voltage, Vdac. The control word, D, is decremented from $N_0$+1 to $N_0$. At the third sampling time, $T_2$+tcomp, the error voltage, Vamp, is still greater than the converter voltage, Vdac. The control word, D, is decremented again from $N_0$ to $N_0$−1. Each control word change changes the duty cycle of the control voltage, Vpwm, to change the output voltage and also changes the converter voltage, Vdac, so that the DC-DC buck converter is able to adapt the output to changes in the input voltage, Vin, and in the load that is driven by the converter.

The digital regulation loop of the controller 160, as described, is compact, may be made from low-cost components, and maintains a consistent, accurate output voltage, Vout, over time. In other analog regulation loops, the control is performed with expensive, quality analog circuits. In other digital regulation loops, the output voltage, Vout, is directly converted to a digital signal for digital analysis using an ADC. The precision of the ADC determines the possible precision of the rest of the regulation loop. In the present digital regulation loop, there is no need for an ADC.

In operation, the control stage 106 is comparing, the DAC voltage, Vdac, to the error voltage, Vamp. Vamp may be defined as follows:

$$\text{Vamp}=\text{Vout\_sel}+R2/R1*(\text{Vout\_sel}-\text{Vout}) \quad \text{(Eq. 1)}$$

where R1, R2 are the relative resistances of the resistors and R2/R1 is the gain K, where Vout_sel is the target voltage that is to be produced at the output terminal, where Vout is the actual output voltage at the output terminal, and where Vout_sel−Vout represents the error of the system E.

In operation, the converter voltage, Vdac, may be defined as follows:

$$\text{Vdac}=D*\text{Vin} \quad \text{(Eq. 2)}$$

where D is the duty cycle coded as the control word on N bits, and where Vin is the input voltage.

In operation, the comparison signal, Comp, is the comparator output that is used by the digital controller 204 to adapt the duty cycle represented by the control signal, Vpwm. The control signal, Vpwm, is the conversion of the control word, D, to a pulse width signal to control the power stage The system of the DC-DC buck converter with digital loop regulation, as shown, tries to equilibrate Vamp and Vdac to drive the error signal, E, to null. This state is represented by the comparison signal, Comp, being null. Using the above, relations and definitions:

$$\text{Vout\_sel}+K*E=D*\text{Vin} \quad \text{(Eq. 3)}$$

The digital regulation loop continually modifies the control signal, Vpwm. The duty cycle of the control signal, Vpwm, is adjusted as the load at the output terminal 146 changes. When the system is stable and the error, E, is null then the true equation of the buck is as follows:

$$D=(\text{Vout\_sel})/\text{Vin} \quad \text{(Eq. 4)}$$

The operation of the DC-DC buck converter may be described as receiving an input voltage, Vin, at the power stage input and generating an output voltage, Vout, at the power stage output in response to a control signal, Vpwm. The control signal is generated in the adjustment block of the controller by comparing the output voltage, Vout, to a reference voltage, Vout_sel, then generating a comparison signal, Comp, in response to the comparing. The control signal, Vpwm, is generated in the logic circuit of the controller in response to the comparison signal, Comp, using a control word, D. A converter voltage, Vdac, is generated in the DAC representing the control word, D, using the input voltage, Vin. The converter voltage, Vdac, is applied to the adjustment block of the controller to adjust the comparison signal, Comp.

The adjustment block generates the comparison by first generating an error voltage, Vamp, that represents a difference between the output voltage, Vout, and the reference voltage, Vout_sel. The adjustment block uses the error voltage, Vamp, to generate the comparison signal, Comp, in response to comparing the error voltage and the converter voltage. The control word, D, is then generated by the logic circuit using the comparison signal, Comp. In some embodiments, this is using an up and down counter, wherein the up and down counter counts in response to the comparison signal. The logic circuit receives a clock signal having a clock frequency. Generating the control signal includes generating a pulse width modulation signal having a switching cycle determined by the clock frequency. The power stage has switches between the input voltage and the output voltage so that opening and closing the switches in response to the control signal generates the output voltage.

Figure 6:
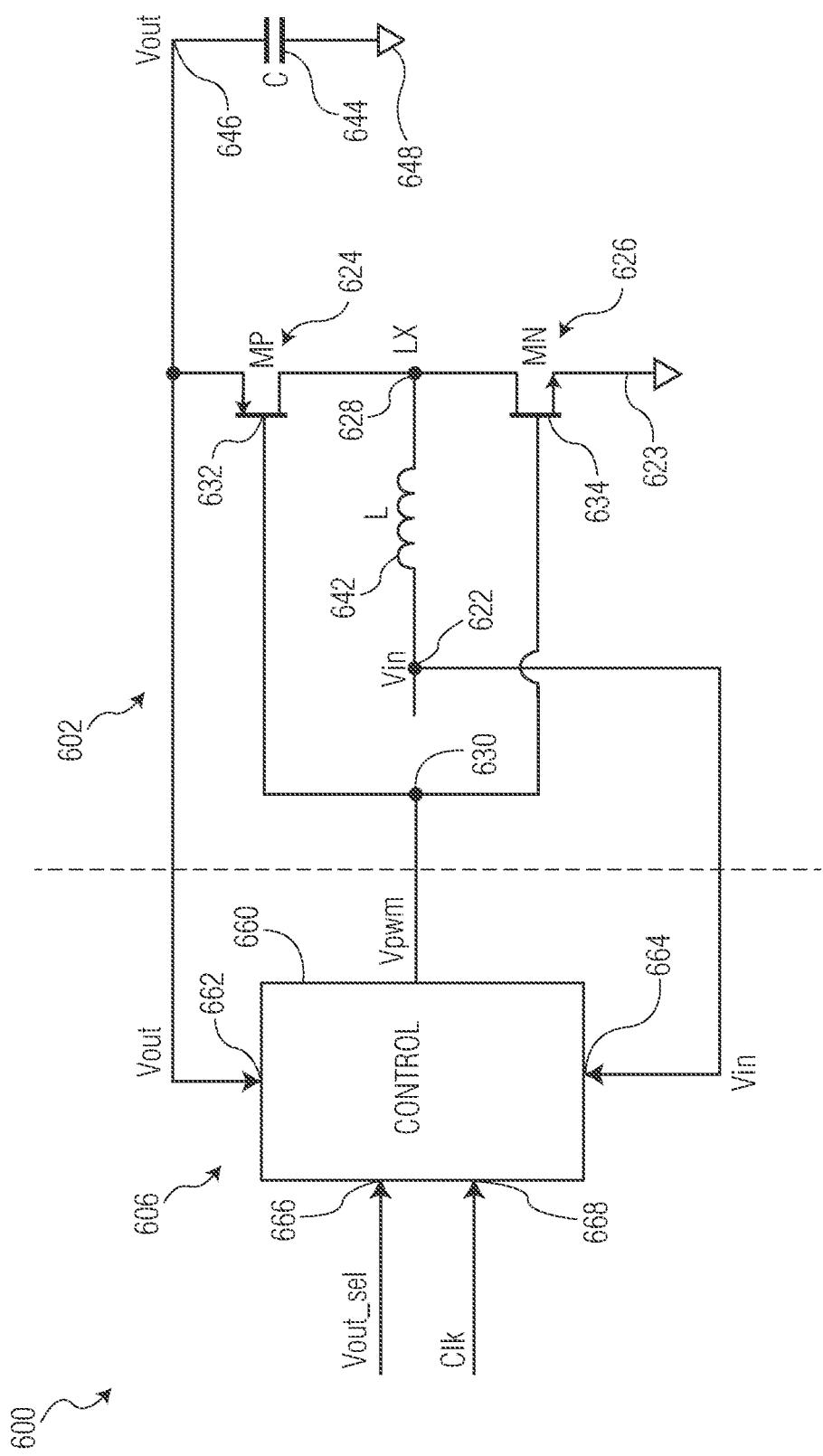
FIG. 6 is a circuit diagram of a DC-DC boost converter.

FIG. 6 is a circuit diagram of a DC-DC boost converter 600. The DC-DC boost converter 200 has a power stage 602 to increase the input voltage to an output voltage including an output filter stage to reduce ripples in the output voltage, and a control stage 606 to regulate the action of the power stage. The control stage is a digital regulation loop.

The power stage has a P-type power MOSFET 624 and an N-type power MOSFET 626 connected anti-parallel and in series. The drain of the P-type power MOSFET 624 is coupled to the drain of the N-type power MOSFET 626 through a common drain node 628. The power stage is coupled to an input voltage, Vin, at an input node 622. The input node 622 is coupled through a series inductor 642 to the common drain node 628. The power stage is also coupled to a control signal, Vpwm, at a control node 630 and is configured to generate an output voltage, Vout, at an output terminal 646, in response to the control signal, Vpwm. The power stage receives the input DC voltage, Vin, across the common drain node 628 and a common or ground node 623. The output voltage, Vout, is taken from the source of the P-type power MOSFET 624 which is coupled to an output terminal 646. The source of the N-type power MOSFET 626 is coupled to the common or ground node 623. The P-type power MOSFET 624 and the N-type power MOSFET 626 are both regulated in common by the control voltage, Vpwm, provided to the control node 630 to a gate 632 of the P-type power MOSFET 624 and to a gate 634 of the N-type power MOSFET 626 from the control stage 606. The control voltage, Vpwm, applies a pulse width modulation (PWM) signal to the control node 630 to control the increase in voltage through the power stage 602. The power stage 602 may be simpler or more complex to suit different uses of the DC-DC boost converter 600.

The output filter portion of the power stage 602 has a series inductor 642 coupled to the input node 622 of the input voltage, Vin, on one side and the common drain node 628 on the other side. A parallel capacitor 644 is coupled between the output terminal 646 and ground 648. The output voltage, Vout, with increased output power from the DC-DC boost converter 600 is taken across the output terminal 646 and ground 648. The simple inductor-capacitor output filter is sufficient for many applications. Other types of components may be used to suit details of particular physical implementations. A simpler or more complex filter may be used to suit different uses of the DC-DC buck converter 600.

The control stage 606 has a controller 660 to generate the control signal, Vpwm, and is coupled to the power stage 602 to provide the control signal to the power stage. The controller is coupled to the output terminal 646 to receive the output voltage, Vout, at a first input terminal 662 of the controller 660. The controller 660 is coupled to the input node 622 to receive the input voltage, Vin, at a second input terminal 664. The controller compares the input voltage, Vin, to the output voltage, Vout, and regulates the power stage 602 using the control voltage Vpwm provided from the controller 660 to the control node 630 of the power stage 602. The controller 660 further receives a reference voltage, Vref, at a third input 666 and a stable reference clock at a fourth input terminal 668 to regulate operations within the controller 660.

Figure 7:
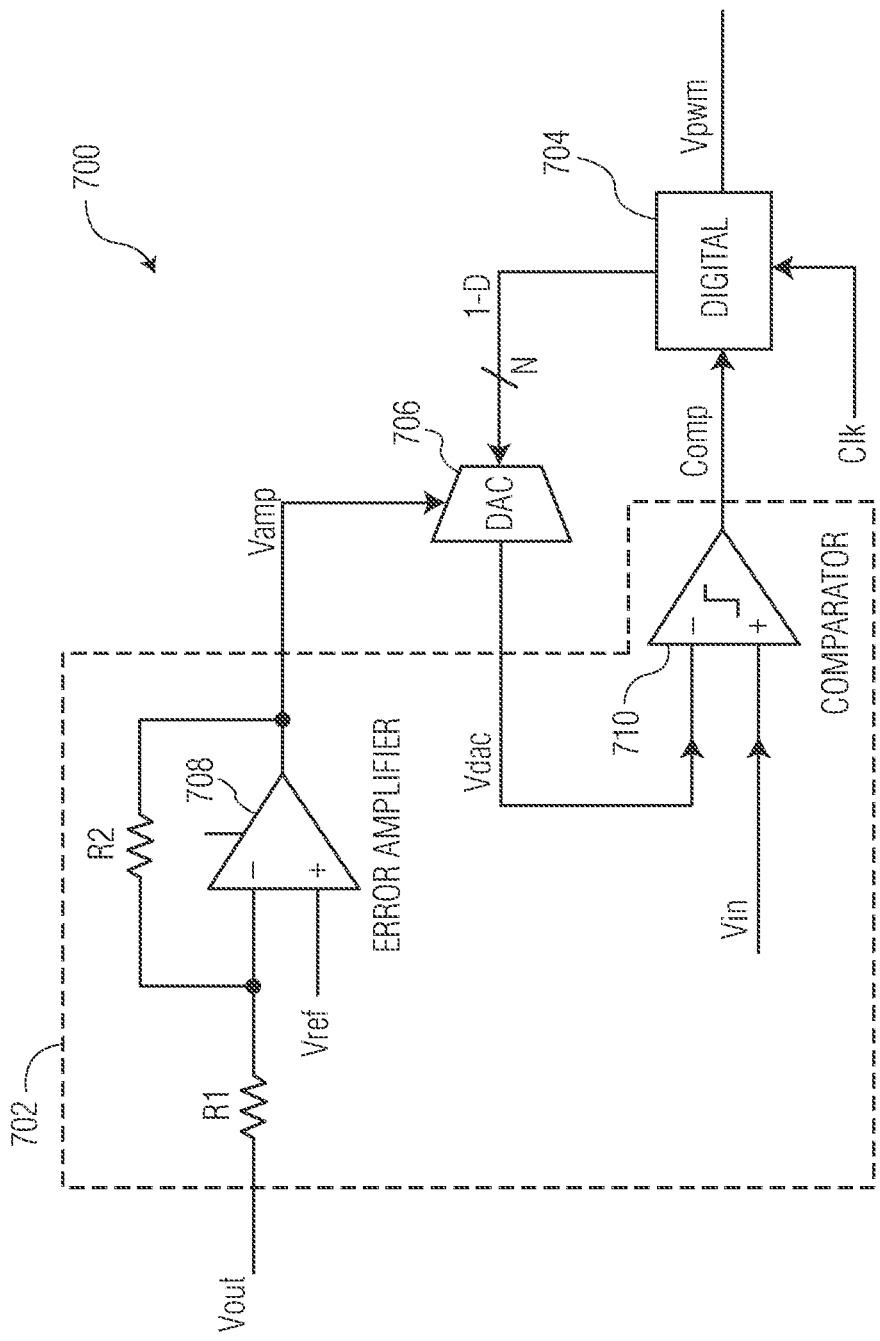
FIG. 7 is a block diagram of an example controller suitable for use in a digital regulation loop for a DC-DC boost converter as described in FIG. 6.

FIG. 7 is a block diagram of an example controller 700 suitable for use in a digital regulation loop for a DC-DC boost converter as described in FIG. 6. The controller 700 includes an adjustment block 702 coupled to receive the output voltage, Vout, from the output terminal 646. The adjustment block 702 is also coupled to a DAC 706 to receive a reference voltage, Vdac. The adjustment block compares the output voltage, Vout, to the reference voltage, Vdac, to generate a comparison signal, Comp.

The controller 700 includes a logic circuit 704 coupled to the adjustment block 702 to receive the comparison signal, Comp, and to generate the control signal Vpwm, in response to the comparison using a control word, D. The control signal, Vpwm, regulates the power stage 602. The logic circuit 704 generates the control signal, Vpwm, using a control word, D, which is coupled to a DAC 706 of the controller. The logic circuit 704 may be configured in the same or a similar way as described above with reference to FIG. 3.

The DAC 706 analog output is the converter voltage, Vdac, coupled as an input to the adjustment block 702. The DAC 706 is coupled to the adjustment block, to receive an error voltage, Vamp, and to the logic circuit 704 to receive the control word, D, from the logic circuit 704. The DAC generates a converter voltage, Vdac, representing the control word, D, in analog form using the error voltage, Vamp. The converter voltage, Vdac, is applied to the adjustment block 702 to adjust the comparison signal, Comp. In some embodiments, the control word, D, is applied to the error voltage, Vamp, as 1−D.

The adjustment block 702 includes an error amplifier 708 and a comparator 710. The error amplifier 708 is coupled to the output voltage, Vout, for example at the output terminal 646 and to the reference voltage, Vref, to generate the error voltage, Vamp, that represents a difference between the output voltage, Vout, and the reference voltage, Vref. The output voltage, Vout, is scaled by a first series resistor, R1, at the error amplifier 708 input, and a second feedback resistor, R2, between the error voltage, Vamp, output and the output voltage, Vout, input to the error amplifier.

The adjustment block 702 also includes a comparator 710 coupled to the input voltage, Vin, as an input and to the converter voltage, Vdac, as an input. The comparator 710 compares the input voltage, Vin, and the converter voltage, Vdac, and generates the comparison signal, Comp, in response to comparing the input voltage, Vin, and the converter voltage, Vdac. As mentioned above, the comparison signal is provided to the logic circuit 704 to generate the control signal, Vpwm, which adapts the duty cycle of the control signal, Vpwm, using the control word, D. The control signal, Vpwm, may be described as the conversion of the control word, D, to a pulse width signal to control the power stage. The control word, D, is also used to generate the converter voltage, Vdac, by factoring the input voltage by the control word, D.

Just as in the buck converter, the boost converter digital regulation loop compares the converter voltage, Vdac, to the error voltage, Vamp. The error voltage may be defined as follows:

$$\text{Vamp} = \text{Vref} + R2/R1 * (\text{Vref} - \text{Vout}) \quad \text{(Eq. 5)}$$

where Vref is the target voltage that is to be produced at the output terminal
where Vout is the actual output voltage;
so that Vref−Vout represents the error of the system E, and R2/R1 is the gain K of the error amplifier 708.

The converter voltage, Vdac, may be expressed as:

$$\text{Vdac} = (1-D) * \text{Vamp} \quad \text{(Eq. 6)}$$

where D is the duty cycle coded as the control word on N bits, and
where Vamp is the error amplifier output voltage.

The system of the DC-DC boost converter with digital loop regulation as shown tries to equilibrate Vin and Vdac to drive the error signal, E, to null. Using the above, relations and definitions for Vamp and Vdac, the following may be written:

$$\text{Vref} + K*E = \text{Vin}/(1-D) \quad \text{(Eq. 7)}$$

The digital regulation loop continually modifies the control signal, Vpwm. The duty cycle of the control signal, Vpwm, is adjusted as the load at the output terminal 146 changes. When the system is stable and the error, E, is null then the term K*E is null, and the true equation of the boost is as follows:

$$\text{Vin} = (\text{Vref})(1-D) \quad \text{(Eq. 8)}$$

The operation of the DC-DC boost converter may be described as receiving an input voltage, Vin, at the power stage input and generating an output voltage, Vout, at the power stage output in response to a control signal, Vpwm. The control signal is generated in the adjustment block of the controller by comparing the output voltage, Vout, to a reference voltage, Vref, then generating a comparison signal, Comp, in response to the comparing. The control signal, Vpwm, is generated in the logic circuit of the controller in response to the comparison signal, Comp, using a control word, D. A converter voltage, Vdac, is generated in the DAC representing the control word, D, using another voltage, such as the error voltage, Vamp, by factoring the error voltage by the control word using 1−D. The converter voltage, Vdac, is applied to the adjustment block of the controller to adjust the comparison signal, Comp.

The adjustment block generates the comparison by first generating the error voltage, Vamp, that represents a difference between the output voltage, Vout, and the reference voltage, Vref. The adjustment block uses the error voltage, Vamp, to generate the comparison signal, Comp, in response to comparing the input voltage and the converter voltage. The control word, D, is then generated by the logic circuit using the comparison signal, Comp. In some embodiments, this is performed using an up and down counter, wherein the up and down counter counts in response to the comparison signal. The logic circuit receives a clock signal having a clock frequency. Generating the control signal includes generating a pulse width modulation signal having a switching cycle determined by the clock frequency. The power stage has switches between the input voltage and the output voltage so that opening and closing the switches in response to the control signal generates the output voltage.

Figure 8:
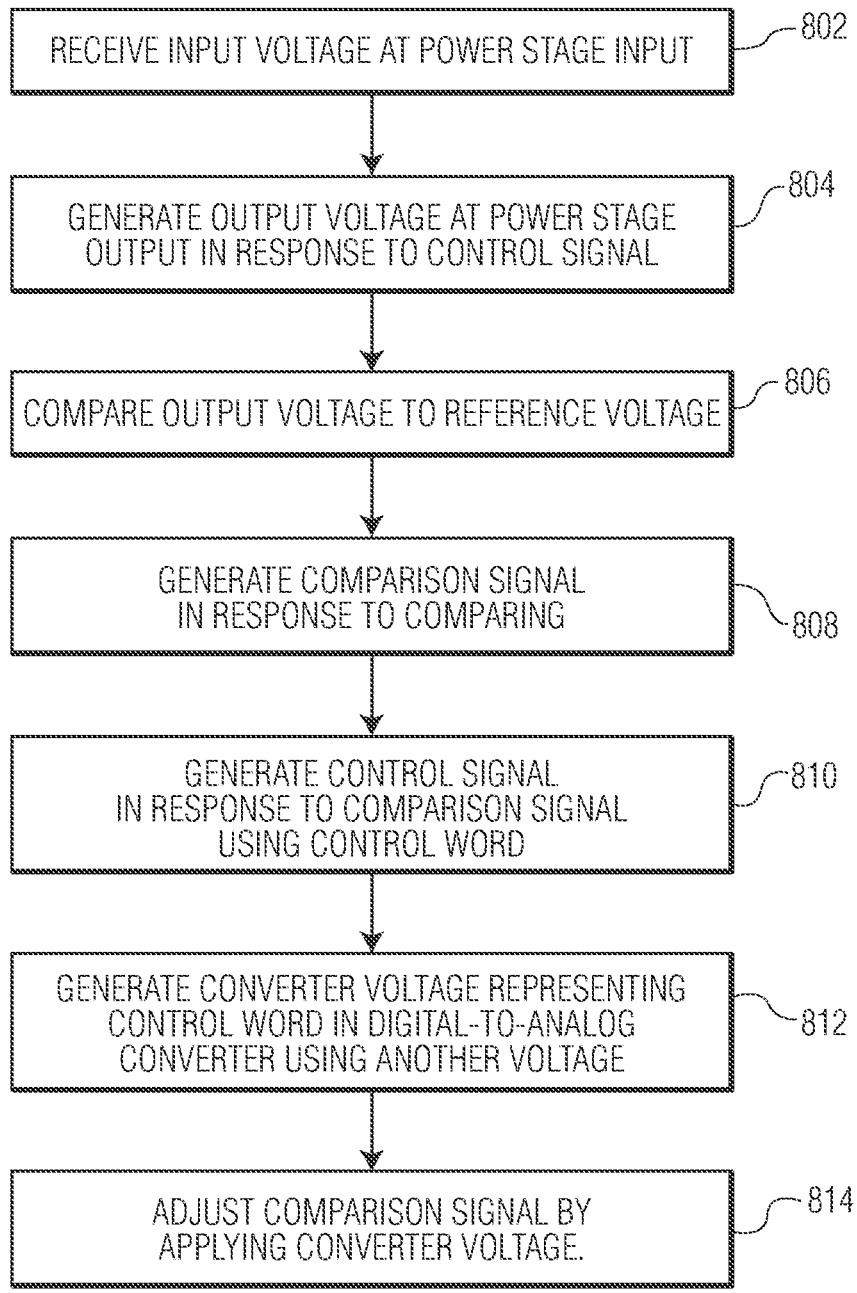
FIG. 8 is a process flow diagram of the operation of a DC-DC buck or boost converter having a digital regulation loop as described above.

FIG. 8 is a process flow diagram of the operation of a DC-DC buck or boost converter having a digital regulation loop as described above. The power converter has an input, which is coupled to a power source, an output which coupled to a load, a controller, and a power stage coupled between the input and the output. The process begins with receiving an input voltage at the power stage input at 802. Generating an output voltage at the power stage output in response to a control signal is performed at 804. In embodiments, the power stage has switches, for example power MOSFETs coupled together between the input voltage and the output voltage. The power stage generates the output voltage by opening and closing switches in response to a control signal.

Comparing the output voltage to a reference voltage is performed at 806. Generating a comparison signal in response to the comparing is performed at 808. In some embodiments, the reference voltage is generated by generating an error voltage that represents a difference between the output voltage and the reference voltage. The converter voltage is generated by factoring the input voltage by a control word. The comparison signal is generated in response to comparing the error voltage and the converter voltage. In some embodiments, the reference voltage is generated by generating an error voltage that represents a difference between the output voltage and the reference voltage. The converter voltage is generated by factoring the error voltage by a control word. The comparison signal in response to comparing the converter voltage and the input voltage.

Generating the control signal in the controller in response to the comparison signal using a control word is performed at 810. In some embodiments, the control word is generated using an up and down counter. The up and down counter counts in response to the comparison signal. In some embodiments, the control signal is generated as a pulse width modulation signal that has a switching cycle determined by a clock frequency received from an external reference.

Generating a converter voltage representing the control word in a digital-to-analog converter using another voltage is performed at 812 and adjusting the comparison signal by applying the converter voltage is performed at 814.

The operations of FIG. 8 are performed repeatedly and continuously as the converter is operating and regulated. The order of the operations is presented for ease of understanding and not to indicate sequency or priority. The operations may be simultaneous and continue in any order.

In the following description and claims, the term "coupled" along with its derivatives, may be used. "Coupled" is used to indicate that two or more elements have a connection that permits interaction but that there may be intervening physical or electrical components between them. "Electrically coupled" is used to indicate that the interaction is electrical as compared to physical, magnetic, or another form of interaction. As used in the claims, unless otherwise specified, the use of the ordinal adjectives "first," "second," "third," etc., to describe a common element, merely indicate that different instances of like elements are being referred to and are not intended to imply that the elements so described must be in a given sequence, either temporally, spatially, in ranking, or in any other manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A power converter comprising:
a power stage coupled to an input voltage and to a control signal and configured to generate an output voltage in response to the control signal; and
a controller to generate the control signal, coupled to the power stage to provide the control signal to the power stage, the controller having:
an adjustment block coupled to the power stage output voltage to compare the output voltage to a reference voltage to generate a comparison signal;
a logic circuit coupled to the adjustment block to receive the comparison signal and to generate the control signal in response to the comparison signal using a control word; and
a digital-to analog converter coupled to the adjustment block, the power stage input voltage and the logic circuit to receive the control word from the logic circuit and to generate a converter voltage representing the control word using another voltage, the converter voltage being applied to the adjustment block to adjust the comparison signal.

2. The power converter of claim 1, wherein the another voltage is the input voltage to the power stage.

3. The power converter of claim 2, wherein the adjustment block comprises:
an error amplifier coupled to the output voltage and to the reference voltage to generate an error voltage that represents a difference between the output voltage and the reference voltage; and
a comparator coupled to the error amplifier and the logic circuit to receive the error voltage and the converter voltage and to generate the comparison signal in response to comparing the error voltage and the converter voltage.

4. The power converter of claim 1, wherein the another voltage is an error voltage related to a difference between the output voltage and the reference voltage.

5. The power converter of claim 4, wherein the adjustment block comprises:
an error amplifier coupled to the output voltage and to the reference voltage to generate an error voltage that represents a difference between the output voltage and the reference voltage; and
a comparator coupled to the error amplifier and the logic circuit to receive the input voltage and the converter voltage and to generate the comparison signal in response to comparing the input voltage and the converter voltage.

6. The power converter of claim 1, wherein the control word represents a duty cycle of the control signal using a number of bits and wherein the converter voltage scales the another voltage based on the duty cycle.

7. The power converter of claim 1, wherein the control word represents a ratio of the output voltage to the input voltage.

8. The power converter of claim 1, wherein the logic circuit generates the control word using an up and down counter and wherein the up and down counter counts in response to the comparison signal.

9. The power converter of claim 1, wherein the logic circuit is coupled to a clock signal having a clock frequency and wherein the control signal is a pulse width modulation signal having a switching cycle determined by the clock frequency.

10. The power converter of claim 9, wherein the logic circuit adjusts the control word at each switching cycle.

11. The power converter of claim 1, wherein the power stage comprises switches between the input voltage and the output voltage and wherein the power stage opens and closes the switches in response to the control signal.

12. The power converter of claim 11, wherein the power stage switches are coupled in series with the control signal coupled to the gates of the switches and with the output voltage at a common drain of the switches.

13. The power converter of claim 1, wherein the power converter comprises a direct current to direct current buck converter.

14. A method of operating a power converter, the power converter comprising an input, an output, a controller, and a power stage coupled between the input and the output, the method comprising:
    receiving an input voltage at the power stage input;
    generating an output voltage at the power stage output in response to a control signal;
    comparing the output voltage to a reference voltage;
    generating a comparison signal in response to the comparing;
    generating the control signal in the controller in response to the comparison signal using a control word; and
    generating a converter voltage representing the control word in a digital-to-analog converter using another voltage, wherein the converter voltage is applied to adjust the comparison signal.

15. The method of claim 14, wherein generating a comparison signal comprises:
    generating an error voltage that represents a difference between the output voltage and the reference voltage;
    generating the converter voltage by factoring the input voltage by the control word; and
    generating the comparison signal in response to comparing the error voltage and the converter voltage.

16. The method of claim 14, wherein generating a comparison signal comprises:
    generating an error voltage that represents a difference between the output voltage and the reference voltage;
    generating the converter voltage by factoring the error voltage by the control word; and
    generating the comparison signal in response to comparing the converter voltage and the input voltage.

17. The method of claim 14, further comprising generating the control word using an up and down counter, wherein the up and down counter counts in response to the comparison signal.

18. The method of claim 14, further comprising receiving a clock signal having a clock frequency and wherein generating the control signal comprises generating a pulse width modulation signal having a switching cycle determined by the clock frequency.

19. A power converter comprising:
    means for generating an output voltage using an input voltage in response to a control signal;
    means for comparing the output voltage to a reference voltage and generating a comparison signal in response to the comparing;
    means for generating the control signal in response to the comparison signal using a control word; and
    means for converting the control word from digital to analog to generate the converter voltage, wherein the converter voltage is applied to adjust the comparison signal.

20. The power converter of claim 19, wherein the means for generating the control word comprises an up and down counter, wherein the up and down counter counts in response to the comparison signal.

* * * * *